June 3, 1969  C. VAN DER LELY  3,447,295
RAKE WHEELS

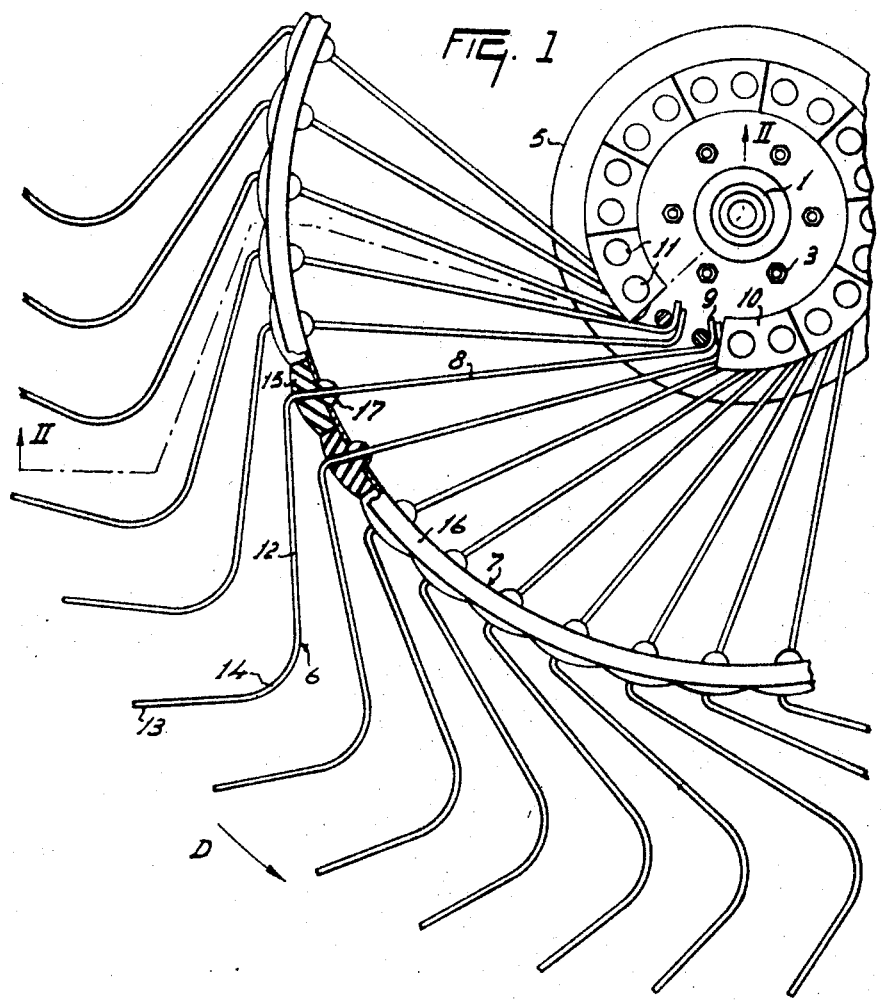
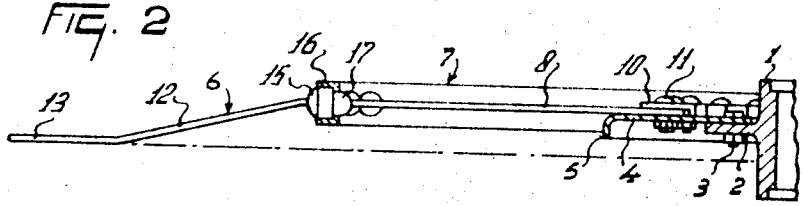

Filed June 15, 1965  Sheet 2 of 4

INVENTOR.
CORNELIS VAN DER LELY
BY
Mason, Mason & Albright
Attorneys

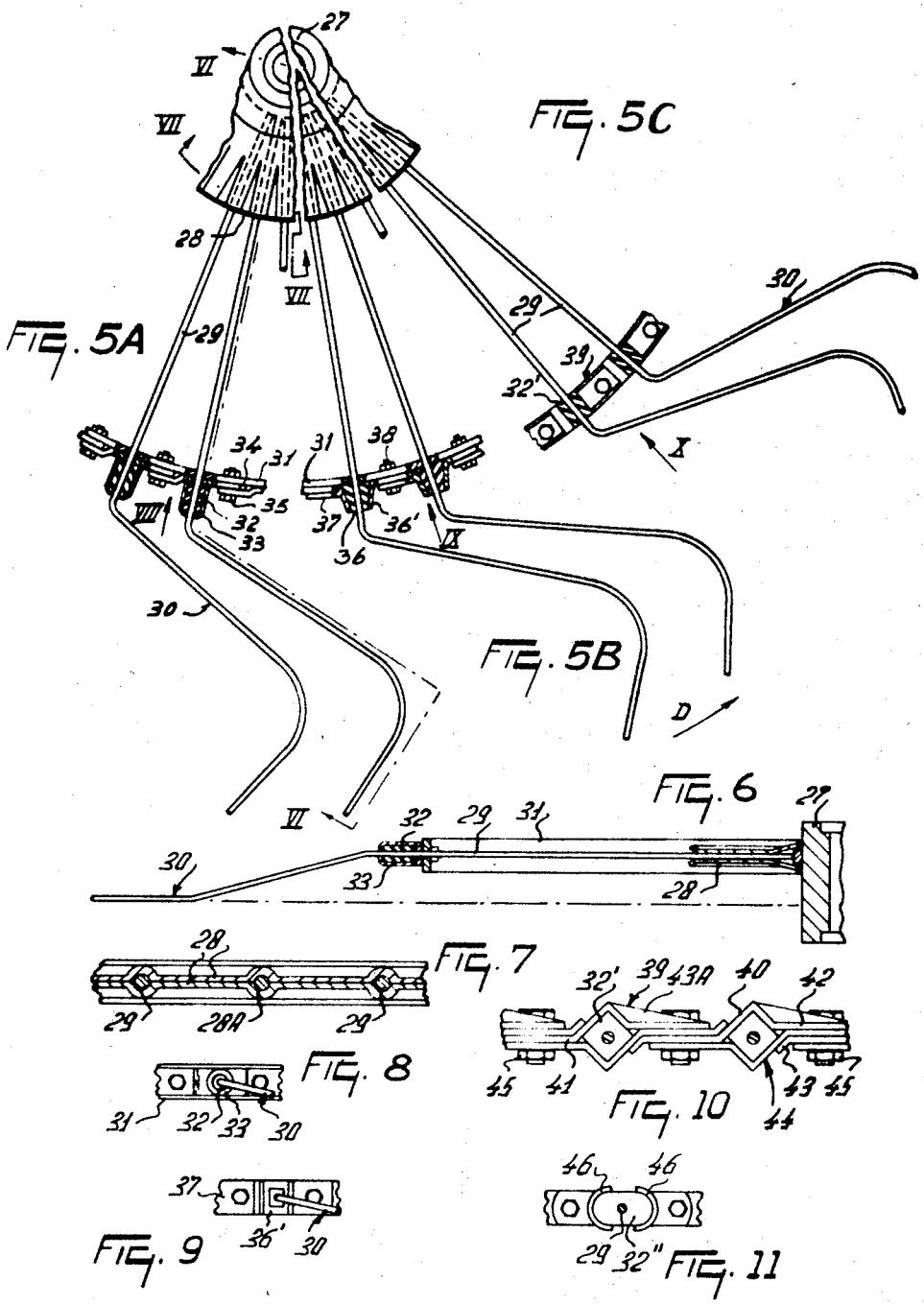

United States Patent Office 3,447,295
Patented June 3, 1969

3,447,295
RAKE WHEELS
Cornelis van der Lely, Zug, Switzerland, assignor to Texas Industries Inc., Willemstad, Curacao, Netherlands Antilles, a limited-liability company
Filed June 15, 1965, Ser. No. 464,119
Claims priority, application Netherlands, July 13, 1964, 6407947, 6407948
Int. Cl. A01d 77/02
U.S. Cl. 56—400        20 Claims

ABSTRACT OF THE DISCLOSURE

This invention relates to rake wheels of the kind that have circumferentially mounted resilient tines which are fastened to a central region of the rake wheel by spokes integral with the tines. Adjacent the juncture between the tines and the spokes, resilient supports are provided for the tines.

---

An object of the invention is the provision of a simple and effective support for the tines of rake wheels of this kind.

According to the invention, there is provided a rake wheel of the kind set forth, wherein the spokes are resiliently supported throughout a part only of their length by an organic elastic material.

For a better understanding of the invention, and to show how the same may be carried into effect, reference will now be made, by way of example, to the accompanying drawings, in which:

FIGURE 1 is a side elevation of part of a rake wheel in accordance with the invention, FIGURE 2 is a section taken on the line II—II of FIGURE 1, FIGURE 3 is a side elevation of an alternative form of rake wheel in accordance with the invention, FIGURE 4 is a section, to an enlarged scale, taken on the line IV—IV of FIGURE 3, FIGURE 5A is a side elevation in section showing the resilient connection between the felly and the tines.

FIGURE 5B is a side elevation in section similar to FIGURE 5A but with a modified resilient tine holder.

FIGURE 5C is a side elevation in section similar to FIGURE 5A and FIGURE 5B but with a further modified resilient tine holder.

FIGURE 6 is a section taken on the line VI—VI of FIGURE 5A,

Figure 12:
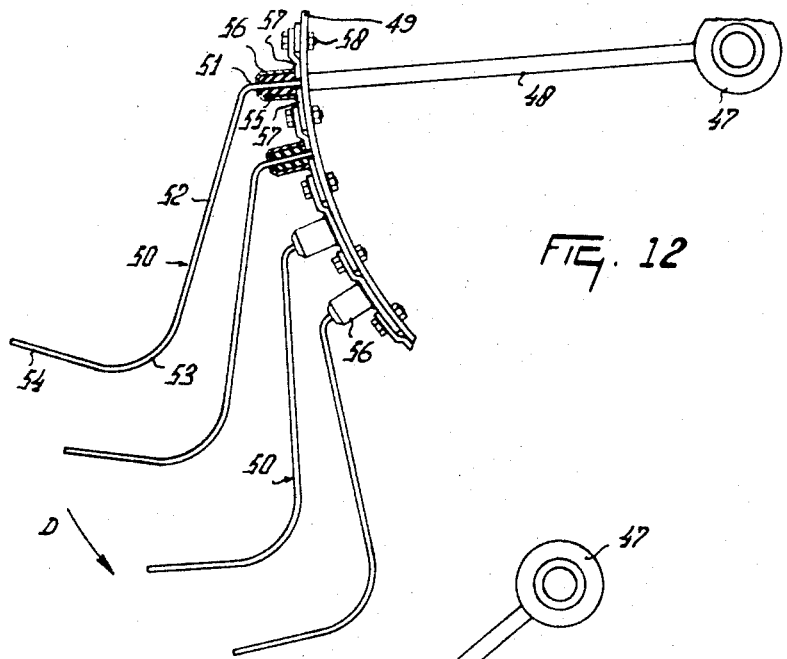
Figure 13:
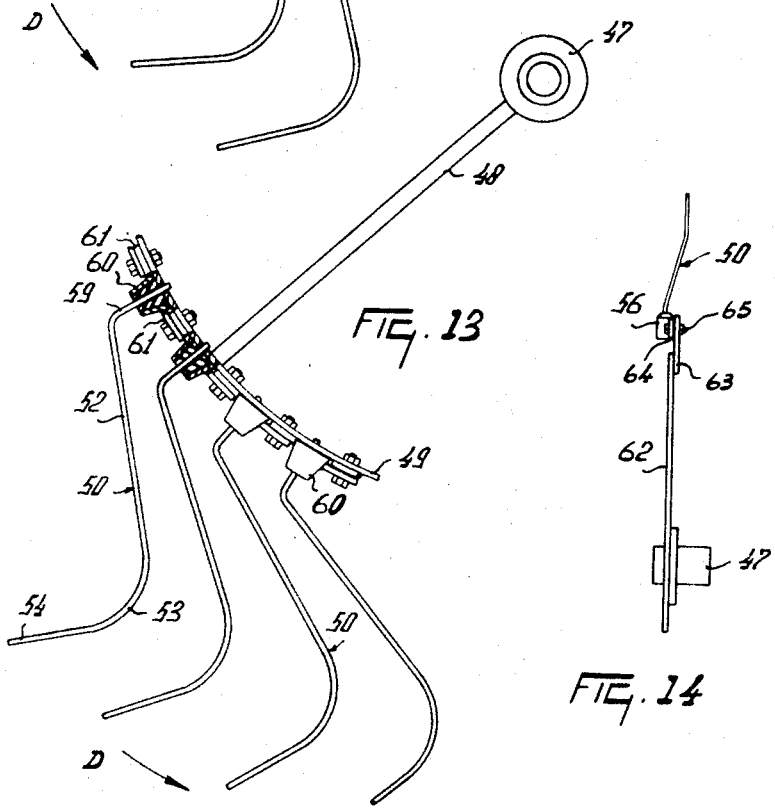
Figure 14:
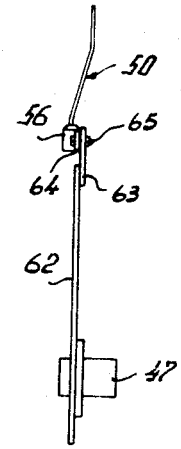

FIGURE 7 is a section, to an enlarged scale, taken on the line VII—VII of FIGURE 5A, FIGURE 8 is a view as seen in the direction indicated by the arrow VIII of FIGURE 5A, FIGURE 9 is a view as seen in the direction indicated by the arrow IX of FIGURES 5B, FIGURE 10 is a view, to an enlarged scale, as seen in the direction indicated by the arrow X of FIGURE 5C, and FIGURE 11 is a view similar to FIGURES 8 to 10 but showing a further alternative embodiment of part of a rake wheel in accordance with the invention, FIGURE 12 is a side elevation of part of a rake wheel in accordance with the invention, FIGURE 13 is a side elevation of an alternative embodiment of part of a rake wheel in accordance with the invention and FIGURE 14 is an elevation, to a reduced scale, of part of a further alternative embodiment of a rake wheel in accordance with the invention, the elevation being viewed in a direction parallel to the plane of rotation of the rake wheel.

Referring to FIGURES 1 and 2 of the drawings, the rake wheel which is illustrated has a central hub 1 from which an upright annular rim 2 projects. An annular plate 4 is secured to one side of the rim 2 by bolts 3, the radially outermost edge of the plate 4 being perpendicularly bent over at 5. The rake wheel has spring steel tines 6 each of which is integral with a corresponding prolongation or spoke 8 that extends through a corresponding hole in a supporting felly 7 of the rake wheel. The end of each spoke 8 remote from the corresponding tine 6 is bent over through 90° at 9, the bent-over ends 9 being clamped to one side of the plate 4 with the aid of segments 10 of a ring. Each segment 10 is fastened in position by a corresponding pair of bolts 11. As can be seen in FIGURE 1 of the drawings, the ring that is formed by all the segments 10 is concentric with the hub 1. The segments 10 lie at that side of the plate 4 which is remote from the bent-over edge 5. It will be seen from FIGURE 1 of the drawings that there are ten segments 10 and that each of these clamps four bent-over ends 9 to the plate 4. Thus, the rake wheel has forty tines 6. Each spoke 8 is straight but is not radial relative to the centre of the rake wheel. However, all the spokes 8 are contained in a plane that extends perpendicular to the axis of rotation coinciding with the centerline of the hub 1.

Each of the tines 6 has an outermost straight cropworking portion 13 the innermost end of which merges into a straight connecting portion 12 by way of a bend 14. Each bend 14 subtends an angle of approximately 90° at its own centre of curvature and it is preferred that, in all cases, the bends 14 should subtend angles of not less than 45° at the centres just mentioned. Each connecting portion 12 is inclined forwardly from the felly 7 relative to the intended direction of rotation D of the rake wheel whilst each crop-working portion 13 is inclined rearwardly from the corresponding bend 14 relative to the same direction.

Each spoke 8 is surrounded, at a point very close to its junction with the corresponding tine 6, by an eleastic element 15 that is preferably formed from rubber, synthetic rubber or a synthetic plastics material that is caused to adhere to the spoke 8 by vulcanisation. It will be evident from the drawings that each element 15 surrounds and positively supports the corresponding spoke 8 throughout only a relatively short portion of the length of the latter. The felly 7 is channel-shaped in cross-section with the two flanges 16 extended outwardly away from the hub and spokes, The forty elements 15 adjoin one another and form a ring concentric with the hub 1, each element lying against the radially outer side of the felly 7 and between its two flanges 16. Each element 15 takes the form of a somewhat elongated block the outermost side of which is of regularly curved convex shape when seen in a direction perpendicular to the plane of rotation of the rake wheel (FIGURE 1). The outermost side of each element 15 is again of regularly curved convex shape when seen in a direction parallel to the plane of rotation of the rake wheel and tangential to the felly 7 (FIGURE 2). The side of each element 15 that faces the hub 1 includes a convex domed portion 17 that completely surrounds the corresponding spoke 8 and which extends through the hole in the felly 7 through which that spoke passes.

Figure 3:
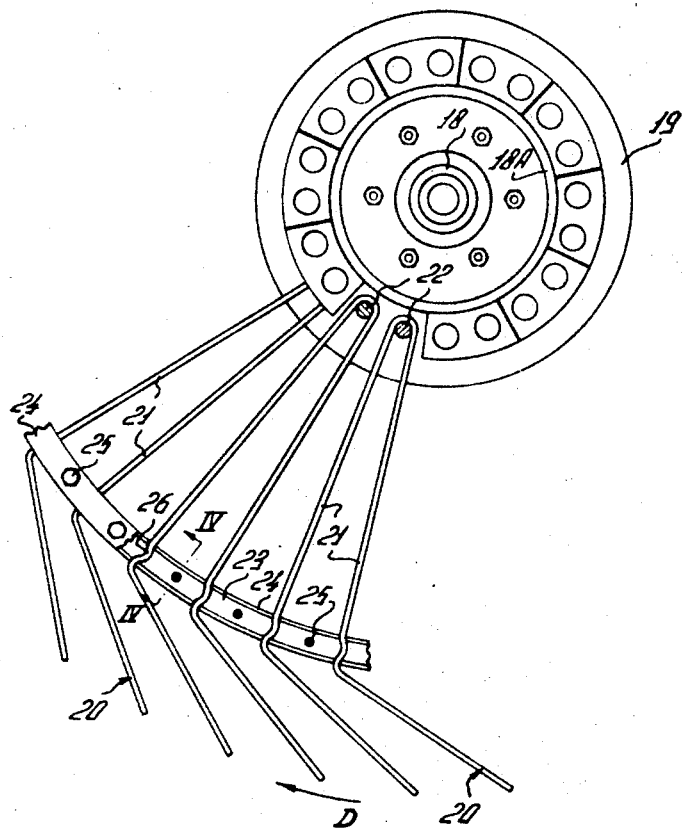
Figure 4:
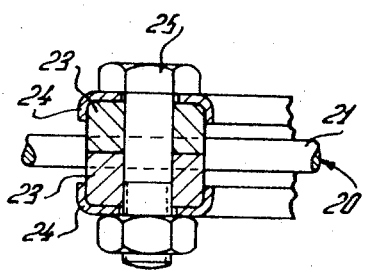

The rake wheel shown in FIGURES 3 and 4 of the drawings has a hub 18 to which an annular plate 19 is bolted so as to lie in a plane perpendicular to the axis of rotation of the hub 18, said plate being formed with an upright rim 18A approximately midway between the centre of the hub 18 and the outermost edge of the plate. The rake wheel has tines 20 and integral spokes 21, neighbouring pairs of tines 20 and spokes 21 being made integrally from single lengths of spring steel wire or rod bent in hair-pin fashion. The approximately 180° bend between each pair of integral spokes partially surrounds the shank of a bolt 22 which is used to clamp the spokes to the plate 19 with the aid of clamping ring segments similar to the segments 10 previously described. The rim 18A serves to prevent the spokes 21 from being axially displaced towards the hub 18 to any appreciable extent.

Two circular strips 23 of elastic organic material such as rubber, synthetic rubber or a synthetic plastics material, bear against opposite sides of all of the spokes 21 adjacent their junctions with the tines 20. Two channel-shaped clamping rings 24 that can best be seen in FIGURE 4 of the drawings bear against the sides of the two strips 23 furtherest from the spokes 21 and are drawn towards one another by bolts 25 each of which lies midway between a pair of spokes 21. The regions of the spokes 21 which are clamped between the elastic strips 23 are curved at 26, the convex side of the curve projecting in a relatively opposite direction to the intended direction of rotation D of the rake wheel. The curved regions 26 are all substantially coplanar with the plane of rotation of the rake wheel at times when the wheel is not in use.

FIGURE 5A shows a rake wheel having a hub 27 to which two interengaging plates 28 are secured so as to extend perpendicular to the axis of rotation afforded by the hub 27. Radial grooves 28A (FIGURE 7) are formed at equal distances around the two plates 28 and face each other in such a way that two grooves 28A form a radially extending opening of substantially circular cross-section in which the root of a corresponding spoke 29 is axially displaceable. Bolts (not shown) secure the two plates 28 to one another. Each spoke 29 passes through a hole in a supporting felly 31 and subsequently merges integrally into a spring steel tine 30 which is of substantially identical construction to the previously described tines 6. Each spoke 29 is surrounded, between the felly 31 and its junction with the corresponding tine 30, by an element 32 of organic elastic material such as rubber, synthetic rubber or a synthetic plastics material which is caused to adhere to the spoke 29 by vulcanisation. Each elastic element 32 is contained in a cylindrical holder 33 formed from sheet metal or other sheet material. Each holder 33 has a foot 34 that projects from relatively opposite sides thereof with the same curvature as the portion of the felly 31 against which it abuts. Bolts 35 are entered through overlapping feet 34 and through the felly 31 to secure the holders 33 to said felly, it being noted that one side of each foot 34 is offset radially outwardly of the rake wheel so that it will overlap the other side (which is not offset) of the neighbouring foot 34. The feet 34 are formed with central holes that receive the spokes 29 and that are in alignment with the holes that are formed in the felly 31 for the same purpose. Each elastic element 32 completely fills its holder 33 and is caused to adhere to the wall of that holder by vulcanisation as well as to the corresponding spoke 29. It will be noted that the radially outermost ends of the cylindrical holders 33 are radially outwardly tapered.

FIGURE 5B illustrates a rake wheel having spokes 29 and tines 30 of substantially identical construction to those described with reference to FIGURE 5A. However, in this case, elastic elements 36 are provided that are of truncated pyramid shape, the taper of each element being directed radially outwardly with respect to the rake wheel. Each element 36 is provided with a holder 36′ of matching internal shape so that it is unnecessary for the elastic elements to be stuck to the holders 36′ in this case. The elements 36 are, however, still caused to adhere to the spokes 29 by vulcanisation. Each holder 36′ has a foot 37 which projects from relatively opposite sides thereof, one side of each foot 37 being offset and the feet being secured to the felly 31 with bolts 38 in a manner similar to that described above with reference to FIGURE 5A.

FIGURE 5C illustrates a rake wheel which once again has spokes 29 and tines 30 identical to those previously described. However, in this case, each spoke 29 is surrounded for a short distance near the junction with the corresponding tine 30 by an elastic element 32′ of square or rhomboid cross-section, each element 32′ being caused to adhere to the corresponding spoke 29 by vulcanisation.

Each element 32′ is contained in a holder 44 (FIGURE 10) formed between two projections 40 of a pair of plates 39. Each projection 40 is flanked on its opposite sides by lugs 41 and 42 respectively, the free end of one lug 41 having a bent-over tip 43 and the lug 42 of the same plate 39 having two stiffening wings 43A. The two plates 39 are clamped to each other by a pair of bolts 45 entered through holes in the lugs 41 and 42 to form the holder 44 and it will be seen from FIGURE 10 of the drawings that the same bolts 45 are employed to secure the lugs 41 and 42 corresponding to one holder 44 to the lugs 41 and 42 of the next holder 44 so that all the plates 39 together form a supporting ring or felly concentric with the hub 27, the plates 39 being generally coplanar with the plane of rotation of the rake wheel.

FIGURE 11 diagrammatically illustrates a further form of holder for an elastic element 32″. The holder consists of two identical semi-circular members 46 which are symmetrically arranged on relatively opposite sides of the oval cross-section element 32″ that surrounds, and is stuck to, a spoke 29. Each member 46 carries a lug and the lugs are bolted to the supporting felly of the rake wheel.

In all of the embodiments which have been described, the spokes are integral with the tines and are resiliently supported throughout a relatively short part of their length by organic elastic material. The organic elastic material tends to oppose resilient deformation of the spokes during use of the rake wheel so that the resilience of the tines is not excessive. When the tines are of somewhat great length as in the cases described with reference to FIGURES 1 and 5 of the drawings, this is a substantial advantage since it ensures that the tines always make a firm engagement with the crop or ground. The tines thus tend to maintain their initial configurations and to return rapidly to the latter as soon as any forces causing resilient deformation cease to act. There is a tendency to substantial wear and eventual breakage at the points at which tines or their spokes extend through holes in fellys but the constructions which have been described greatly reduce or entirely avoid wear at the points just mentioned. The constructions of FIGURES 1 and 3 are such that the tines can deflect to a substantial extent radially of the rake wheel so that they can match undulations in the ground surface without difficulty. This tends to avoid the formation of small areas of undisplaced crop. In the use of the rake wheel illustrated in FIGURES 1 and 2 of the drawings, the inwardly displaced tines 6 come into contact with the curved outer sides of the elements 15 which thus prevent excessive deformation that might produce permanent bending of the tines. The curved regions 26 of the spokes 21 illustrated in FIGURE 3 serve a similar purpose. It will be apparent that, in all of the embodiments which have been described, a single tine and its spoke or a single pair of tines and spokes can be easily replaced if serious wear or damage should occur.

Referring to FIGURE 12 of the drawings, the rake wheel which is illustrated has a central hub 47 to which a circular felly 49 is substantially rigidly connected by a plurality of spokes 48 only one of which is illustrated in the drawings. Spring steel tines generally indicated by the reference numeral 50 are mounted on the felly 49 which thus acts as a support for the said tines. Each tine 50 has a short radial portion 51 which merges by way of a bend into a longer connecting portion 52 which is inclined forwardly from the portion 51 relative to the intended direction of rotation D of the rake wheel. The end of the connecting portion 52 remote from the radical portion 51 merges by way of a bend 53 into a crop-working portion 54 which is inclined rearwardly from said bend 53 relative to the direction D. Each bend 53 subtends an angle of about 90° at its own centre of curvature and it is preferred that this angle should always be not less than 45°.

The radial portion 51 of each tine 50 is entered in a corresponding holder 56 that is secured to the felly 49. An element 55 formed from organic elastic material such as rubber, synthetic rubber or synthetic plastics material, surrounds substantially the whole of the portion 51 internally of the holder 56 and is caused to adhere to the portion by vulcanisation. The holders 56 are cylindrical sleeves of circular cross-section and the elements 55 are also caused to adhere to the internal walls of the holders by vulcanisation. The holders 56 are formed from sheet metal or other sheet material and the end of each holder that is remote from the felly 49 tapers radially outwardly of the rake wheel. Each holder 56 has a foot 57 that projects from relatively opposite sides thereof against the felly 49 and which is fastened to said felly by bolts 58. As can be seen in FIGURE 12 of the drawings, one side of each foot 57 is offset radially outwardly of the rake wheel in such a way that it overlaps the opposite side (which is not offset) of the foot 57 of the neighbouring holder 56. The bolts 58 are entered through the overlapping feet 57 and through the felly 49. Each foot 57 is formed with a central hole in which the radially innermost end of the radial portion 51 is entered so that its tip bears against the radially outer surface of the felly 49. This arrangement maintains central positions of the portions 51 in the holders 56.

The rake wheel of FIGURE 13 is generally similar to the one which has already been described and like parts are designated by the same reference numerals as are used in FIGURE 12. The tines 50 have radial portions 59 which are longer than the previously described radial portions 51 and the radially innermost end of each of them is entered in a corresponding centering hole formed through the felly 49. Once again, each portion 59 has an element of organic elastic material stuck to it in surrounding relationship, said element also being received internally of a holder 60. However, in this case, the holders 60 are of truncated pyramid shape so that it is not absolutely necessary for the organic elastic elements to be stuck to them to prevent rotation. Each holder 60 has a foot 61 and the feet 61 are secured to the felly 49 in overlapping relationship by means of bolts in a similar manner to that described with reference to FIGURE 12.

FIGURE 14 illustrates diagrammatically a rake wheel having a single circular plate 62 instead of the aforedescribed spokes 48. An annular support 63 is mounted around the edge of the plate 62 and holders 56 having feet 64 are secured to said support by bolts 65. It will be noted that, in this case, the feet 64 are substantially coplanar with the plane of rotation of the rake wheel instead of substantially perpendicular thereto as in the cases of FIGURES 12 and 13.

In all three of the embodiments which have been described, the tines 50 are resiliently connected to the supporting felly 49 or support 63 through the intermediary of the organic elastic material contained in the holders 56 or 60. The resilience of this material in conjunction with the shape of the tines 50 is such that the crop-working portions 54 of the tines can deflect laterally of the plane of rotation of the rake wheel readily by turning about the portion 51 or 59 against resilient opposition. Nevertheless, deflections of this kind do not interfere to any appreciable extent with the general configuration of the tines 50 so that they maintain their operative positions. The organic elastic material ensures that the tines 50 return rapidly to their initial undeflected positions as soon as the deflecting forces cease to act thereon.

The risk of breakage of the rake wheel tines is substantially reduced by the use of the rake wheels which have been described, but, if one tine 50 should become badly worn or broken, it can be easily replaced, together with its resilient mounting, without it being necessary to dismantle the rest of the rake wheel.

What I claim is:

1. A rake wheel having a hub and spokes radiating from said hub, the outer end of each spoke comprising a tine, said spokes being resiliently supported along part of their lengths by organic resilient means, said resilient means being located adjacent the junction between said spokes and their corresponding tines, each of said spokes being resiliently supported by an organic resilient element and the elements supporting neighbouring spokes adjoining one another.

2. A rake wheel having a hub and spokes radiating from said hub, the outer end of each spoke comprising a tine, said spokes being resiliently supported along part of their lengths by organic resilient means, said resilient means being located adjacent the junction between said spokes and their corresponding tines, said resilient means comprising strips located on relatively opposite sides of said spokes, each strip subtending an angle of 360° at the axis of rotation of the rake wheel, said strips being urged into engagement with each other and said spokes by clamping rings, said rings being located on relatively opposite sides of said rake wheel and being drawn towards one another by fastening members located between succeeding spokes.

3. A rake wheel as claimed in claim 2, wherein a curved segment of each spoke lies between said strips, each curved segment of said spokes being coplanar with a plane extending substantially parallel to, the plane of rotation of said rake wheel when said rake wheel is not in use, the convex side of each curved segment projecting in a direction relatively opposite to the intended direction of rotation of the said wheel.

4. A rake wheel having a hub and spokes radiating from said hub, the outer end of each spoke comprising a tine, said spokes being resiliently supported along part of their lengths by organic resilient means, said resilient means being located adjacent the junction between said spokes and their corresponding tines, a holder enclosing said resilient means and said rake wheel including a felly, each spoke having a corresponding holder and said holder being provided with a foot secured to said felly, said resilient means being applied to each holder.

5. A rake wheel as claimed in claim 4, wherein the feet of neighbouring holders overlap one another.

6. A rake wheel as claimed in claim 4, wherein each holder has a non-circular cross-sectional shape whereby said resilient means is prevented from turning therein.

7. A rake wheel as claimed in claim 4, wherein there is a holder corresponding to each spoke, each of said holders being an elongated cylindrical sleeve.

8. A rake wheel as claimed in claim 7, wherein each sleeve has a circular cross-section with the radially outermost end thereof relative to the center of the rake wheel having a radially outwardly directed taper.

9. A rake wheel as claimed in claim 4, wherein each holder has a truncated pyramid configuration.

10. A rake wheel as claimed in claim 7, wherein each sleeve is plural sided, the sleeves of successive spokes being coupled to one another whereby a ring concentric with the hub of the rake wheel is formed.

11. A rake wheel as claimed in claim 4, wherein each spoke extends through a hole formed in the foot of the corresponding holder whereby said spoke is centered in its holder.

12. A rake wheel having a hub connected to a circular tine support, a plurality of tines carried by said support, holders on said support for retaining said tines, each of said holders housing an elongated resilient sleeve of organic material and each of said holders having a foot secured to said support, said holders being tapered radially outwardly relative to said hub.

13. A rake wheel as claimed in claim 12, wherein each of said resilient sleeves is affixed to its corresponding holder.

14. A rake wheel as claimed in claim 12, wherein each holder has a non-circular cross-sectional shape, whereby said resilient sleeves are prevented from turning therein.

15. A rake wheel as claimed in claim 12, wherein each of said holders is an elongated cylindrical housing.

16. A rake wheel as claimed in claim 12, wherein the feet of neighboring holders overlap one another.

17. A rake wheel as claimed in claim 12, wherein each holder has a truncated pyramid configuration.

18. A rake wheel as claimed in claim 12, wherein said tine support portion is a felly and spokes connect said felly to said hub, said spokes comprising a portion of said tines.

19. A rake wheel as claimed in claim 18, wherein each spoke extends through a hole formed in the foot of a corresponding holder whereby said spokes are centered in said holders.

20. A rake wheel as claimed in claim 12, wherein each of said tines has a part inclined forwardly from its corresponding holder relative to the intended direction of rotation of said rake wheel, said part merging through a bend into a portion inclined in a relatively opposite direction.

References Cited

UNITED STATES PATENTS

| | | | |
|---|---|---|---|
| 1,383,991 | 7/1921 | Kemp | 301—67 |
| 2,043,442 | 6/1936 | McNeil | 37—142 XR |
| 2,644,284 | 7/1953 | Oberholtz et al. | 56—21 |
| 2,874,529 | 2/1959 | Van der Lely et al. | 56—400 |
| 2,926,481 | 3/1960 | Van der Lely et al. | 56—395 |
| 2,931,161 | 4/1960 | Johnston | 56—400 |
| 3,010,526 | 11/1961 | Van der Lely et al. | 56—400 |
| 3,226,922 | 1/1966 | Luther et al. | 56—400 |

FOREIGN PATENTS

| | | |
|---|---|---|
| 674,797 | 7/1952 | Great Britain. |
| 1,193,150 | 4/1959 | France. |
| 1,207,529 | 9/1959 | France. |
| 208,120 | 3/1960 | Austria. |
| 615,892 | 1/1961 | Italy. |
| 1,333,454 | 6/1963 | France. |

RUSSELL R. KINSEY, *Primary Examiner.*